P. M. GELATT.
GAGE.
APPLICATION FILED JAN. 22, 1917.

1,233,338.

Patented July 17, 1917.

Witness
Chas. W. Stauffer

Inventor
Philo M. Gelatt.
By
Attorney

UNITED STATES PATENT OFFICE.

PHILO M. GELATT, OF LA CROSSE, WISCONSIN.

GAGE.

1,233,338.      Specification of Letters Patent.      Patented July 17, 1917.

Application filed January 22, 1917. Serial No. 143,786.

*To all whom it may concern:*

Be it known that I, PHILO M. GELATT, a citizen of the United States of America, residing at La Crosse, in the county of La Crosse and State of Wisconsin, have invented certain new and useful Improvements in Gages, of which the following is a specification, reference being had therein to the accompanying drawings.

This invention relates to a tank gage, and more particularly one adapted for automobile vehicles or the like, and to an arrangement thereof whereby rigidity is obtained by a construction that permits the manufacture of the gage in large quantities at slight expense, while at the same time the accuracy of the instrument and its freedom from vibration and fluctuations under use, are not in any manner lessened but are rather enhanced by the design.

The invention consists in the matters hereinafter set forth, and more particularly pointed out in the appended claims.

Figure 1:
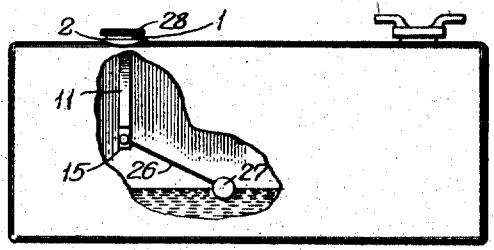
Figure 1 is a view in elevation, partially broken away, of an automobile tank equipped with a gage that embodies features of the invention.
Figure 3:
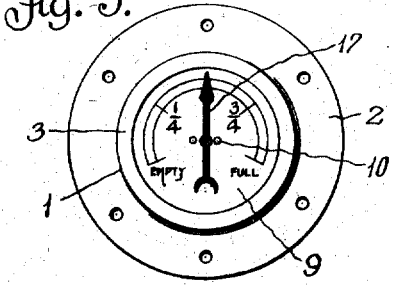
Fig. 3 is a plan view of the dial plate and case.
Figure 5:
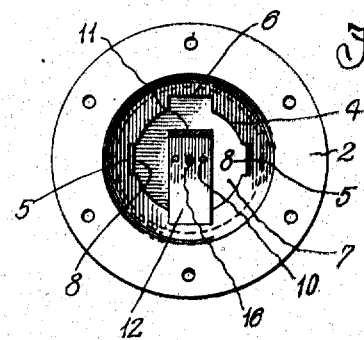
Fig. 5 is a view of the under side of the assembled dial casing and dial plate with a depending float support and float stem shown in section.
Figures 2, 4, 6, 7:
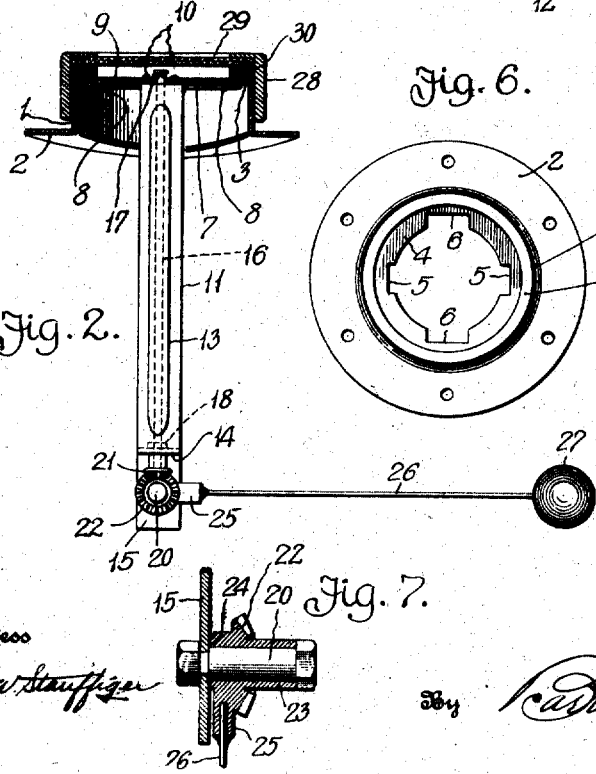
Fig. 2 is a view partially in section and partially in elevation, of the device withdrawn from the tank.
Fig. 4 is a view taken at right angles to Fig. 3, partially in elevation and partially in section, but with the exterior casing removed and the dial plate, pointer and float mechanism shown in assembled relation.
Fig. 6 is a view in detail of the casing proper.
Fig. 7 is a view in detail of a portion of the float mechanism.

As herein shown in preferred form, a circular casing 1 has a base flange 2 whereby it may be suitably secured over an opening in a tank wall. An inner annular flange 3 has an interrupted inset marginal portion 4 that is provided with diametrically opposite rectangular notches 5 and oppositely disposed and arranged recesses 6. A sealing plate 7 that is adapted to seat on the recessed portion 4 of the flange 3, has downturned lugs 8 which are struck up from the body of the plate without in any way breaking the margin of the plate so that the circumferential contact between the same and the flange 4 is unbroken, thus avoiding any leakage. The downturned ears register with and interlock in the notches 5. This centers the plate in a desired position.

A dial plate 9 is mounted on the sealing plate and is secured thereto by a pair of rivets 10 or like means which likewise pass through a depending spindle support 11. The latter consists of a sheet metal strip bent at right angles to form the head 12 through which the rivets 10 pass directly, the extremity of the head lying in either of the notches 6 of the rib 4 according to the direction which it is desired to have the float stem take.

The main portion of the strip is stiffened by an embossed rib 13. At the lower portion of the strip, the latter is inturned to form a bearing bracket 14 substantially parallel with the head 12 and a depending foot 15.

An upright spindle 16 passes through alined apertures in the head 12 and part 14, an index hand 17 being mounted on the upper end above the dial plate 6. A stop collar in the form of a split ring 18 or the like encircles the stem and turns on the member 14, thereby preventing downward motion of the spindle.

A stud 20 at right angles substantially to the spindle 16 is mounted on the foot 15. A beveled pinion 21 on the portion of the stem below the part 14, meshes with a gear member 22 which has an elongated hub 23 that gives a firm bearing on the stud 20, while an inner annular shoulder 24 forms a thrust bearing against the foot 15 of the supporting bracket and prevents undue friction. An arm 25 formed integrally on the gear member, extends radially therefrom and is apertured to receive the stem 26 of a float 27.

The dial plate 6 is clamped in position, together with the sealing plate 7, by means of an interiorly flanged casing collar 28 having a glass or transparent shield 29, there being an interposed gasket 30 to seal the joint. Preferably the collar screws on to the casing 1.

As a result of this construction, a very light, readily manufactured and easily and accurately working float gage is obtained that is quickly mounted on any tank, and when once in position is sufficiently rigid to withstand shocks of use on a moving vehicle such as an automobile, while the simplicity of design precludes liability to injury or binding of the operating parts.

Obviously, changes in the construction may be made without departing from the spirit of my invention and I do not care to limit myself to any particular form or arrangement of parts.

What I claim is:

1. A tank gage comprising a casing, a sealing plate non-rotatably engaging on and closing the casing, a dial plate on the sealing plate, a spindle support that depends from the sealing plate, and is bent near the lower end to provide a bearing bracket and foot, means securing the support to the sealing and dial plates, a spindle journaled in the bracket, an index hand on the spindle sweeping the dial plate, a gear journaled on the foot transverse to the spindle, a pinion on the spindle meshing with the gear, and a float secured to a stem extending substantially radially from the gear.

2. A tank gage comprising a casing, an interrupted flange that extends inwardly from the casing and has locating notches, a sealing plate resting on the flange and having depending lugs interlocking non-rotatably with the notches, a dial plate on the sealing plate, a spindle support depending from the sealing plate, means near the end of the support for supporting a rotatable gear, a spindle journaled in the support transversely to the support of the gear, an index hand secured on the spindle above the sealing plate, means for securing the sealing plate on the casing, a pinion on the spindle, a gear operatively connected to the pinion and mounted on the support, and a float operatively connected to the gear to oscillate the latter.

3. A tank gage comprising a casing having an inner peripheral flange with a notched or interrupted margin, a sealing plate non-rotatably engaging with the notched margin and resting on the casing, a dial plate on the sealing plate, a spindle support that depends from the sealing plate and is bent near the lower end to provide a bearing bracket and foot, a spindle journaled in the support, an index hand on the spindle sweeping the dial plate, a gear journaled on the foot transversely to the spindle, a pinion on the spindle meshing with the gear, and a float operatively connected to the gear to oscillate the latter.

4. A tank gage comprising a casing, an inner annular flange in the casing having a notched and interrupted marginal portion, a sealing plate resting on the flange, depending ears from the sealing plate engaging notches in the flange, a dial plate on the sealing plate, a spindle support secured to both plates, a spindle journaled in the support and extended through the plates, an index hand on the spindle sweeping the dial plate, a pinion on the spindle, a gear journaled on the support in mesh with the pinion, a radially disposed stem extending from the gear, a float for oscillating the stem, and a casing collar having a transparent shield and engaging over the casing for securing the plates against the flange.

5. A tank gage comprising a casing, an inner annular flange on the casing provided with an offset notched marginal portion, a sealing plate resting on the offset portion and having depending lugs interlocking with the notches, a spindle support strip bent transversely near its upper end to form a head and near its lower end to form a bearing bracket and offset foot, means securing the head against the underside of the sealing plate, a spindle rotatably mounted in the bracket portion and in an aperture in the head and plate, a pinion on the lower portion of the spindle, a stud on the foot and transverse to the spindle, a gear journaled on the stud in mesh with the pinion and provided with a lateral extension, and a float and stem secured to the lateral extension.

6. A tank gage comprising a casing having an inner annular flange with a depressed marginal portion provided with notches, a sealing plate fitting the depressed portion, lugs on the plate interlocking with the marginal notches, a dial plate resting on the flange and sealing plate, means for clamping the plates on the casing, a spindle support strip bent transversely near its upper end to form a head that is secured to the under face of the sealing plate and near the lower end to form a bearing bracket and offset portion, a spindle journaled in alined apertures in the bracket, head and plates, a pinion on the spindle below the bracket, a gear on the foot meshing with the spindle, and a float operatively connected to the gear to oscillate it.

In testimony whereof I affix my signature in the presence of two witnesses.

PHILO M. GELATT.

Witnesses:
ANNA M. DORR,
CHAS. W. STAUFFIGER.